United States Patent
Chatter et al.

(10) Patent No.: US 10,764,645 B2
(45) Date of Patent: Sep. 1, 2020

(54) VIEWER-INTERACTIVE ENHANCED VIDEO ADVERTISEMENTS

(71) Applicant: Sunshine Partners LLC, Concord, MA (US)

(72) Inventors: Priti H Chatter, Concord, MA (US); Sonal Chatter, Concord, MA (US)

(73) Assignee: Sunshine Partners LLC, Concord, MA (US)

( * ) Notice: Subject to any disclaimer, the term of this patent is extended or adjusted under 35 U.S.C. 154(b) by 0 days.

(21) Appl. No.: 14/602,983

(22) Filed: Jan. 22, 2015

(65) Prior Publication Data
US 2015/0208131 A1 Jul. 23, 2015

Related U.S. Application Data

(60) Provisional application No. 61/930,438, filed on Jan. 22, 2014.

(51) Int. Cl.
| | |
|---|---|
| *H04N 21/4725* | (2011.01) |
| *H04N 21/478* | (2011.01) |
| *H04N 21/81* | (2011.01) |
| *H04N 21/858* | (2011.01) |
| *H04N 21/234* | (2011.01) |
| *H04N 21/472* | (2011.01) |
| *H04N 21/2343* | (2011.01) |

(52) U.S. Cl.
CPC ... *H04N 21/4725* (2013.01); *H04N 21/47815* (2013.01); *H04N 21/812* (2013.01); *H04N 21/8133* (2013.01); *H04N 21/8583* (2013.01); *H04N 21/8586* (2013.01); *H04N 21/23412* (2013.01); *H04N 21/234318* (2013.01); *H04N 21/472* (2013.01); *H04N 21/47205* (2013.01); *H04N 21/858* (2013.01)

(58) Field of Classification Search
CPC ..... H04N 21/23412; H04N 21/234318; H04N 21/47205; H04N 21/472; H04N 21/858
See application file for complete search history.

(56) References Cited

U.S. PATENT DOCUMENTS

| | | |
|---|---|---|
| 5,633,683 A | 5/1997 | Rosengren et al. |
| 6,496,981 B1 | 12/2002 | Wistendahl et al. |
| 6,741,684 B2 | 5/2004 | Karrs |
| 7,958,533 B2 | 6/2011 | Kikinis et al. |

(Continued)

OTHER PUBLICATIONS

Advanced Television Systems Committee, "ATSC Digital Television Standard, Part 1—Digital Television System", 2013.

(Continued)

*Primary Examiner* — Benjamin R Bruckart
*Assistant Examiner* — Akshay Doshi
(74) *Attorney, Agent, or Firm* — Sunstein LLP

(57) ABSTRACT

Systems and methods are provided whereby a viewer's selection of an object that is displayed in a video image results in information about that object being provided to the viewer. In preferred embodiments, a viewer's selection of an object that is displayed in a video image can result in an advertisement about the product or service that is represented by the object being provided to the viewer. In particularly preferred embodiments, the display of an advertisement about the product or service that is represented by the object can allow the viewer to purchase the product or service.

34 Claims, 8 Drawing Sheets

(56) References Cited

U.S. PATENT DOCUMENTS

| | | |
|---|---|---|
| 8,246,454 B2 | 8/2012 | Zalewski |
| 8,312,486 B1 | 11/2012 | Briggs et al. |
| 8,352,983 B1 | 1/2013 | Chane et al. |
| 8,769,584 B2 | 7/2014 | Neumeier et al. |
| 2002/0087988 A1 | 7/2002 | Lipscomb et al. |
| 2009/0327894 A1* | 12/2009 | Rakib ............... G11B 27/34 715/719 |
| 2010/0103173 A1 | 4/2010 | Lee et al. |
| 2010/0228631 A1* | 9/2010 | Zhang ............... G06Q 30/02 705/14.66 |
| 2010/0299687 A1* | 11/2010 | Bertino-Clarke ........... G06Q 30/0241 725/5 |
| 2011/0137753 A1* | 6/2011 | Moehrle ............ G06Q 30/02 705/27.1 |
| 2012/0167146 A1* | 6/2012 | Incorvia ......... H04N 21/234318 725/60 |
| 2012/0310745 A1* | 12/2012 | Bhatia ............... G06Q 30/02 705/14.66 |
| 2012/0311420 A1* | 12/2012 | Penberthy ............ G06F 17/30 715/205 |
| 2013/0132515 A1* | 5/2013 | Mostafa ............. H04L 67/32 709/217 |
| 2013/0139209 A1 | 5/2013 | Urrabazo et al. |
| 2013/0227622 A1 | 8/2013 | Landow et al. |
| 2013/0311633 A1* | 11/2013 | Barnett ............ G06Q 30/0241 709/223 |
| 2014/0058849 A1* | 2/2014 | Saifee ............... G06Q 30/0275 705/14.71 |
| 2014/0068665 A1 | 3/2014 | Evans et al. |
| 2014/0164099 A1* | 6/2014 | Schlesinger ....... G06Q 30/0277 705/14.43 |
| 2014/0229971 A1 | 8/2014 | Noland |
| 2015/0120467 A1* | 4/2015 | Hermida ........... G06Q 30/0275 705/14.71 |
| 2016/0119692 A1 | 4/2016 | Chatter et al. |

OTHER PUBLICATIONS

Unknown, *Understanding Metadata*, National Information Standards Organization, Published by NISO Press, 20 pages, 2004.
United States Patent and Trademark Office, Office Action—U.S. Appl. No. 14/922,140, dated Jun. 30, 2016, 16 pages.
Bowditch & Dewey, LLP Response to Office Action—U.S. Appl. No. 14/922,140, dated Feb. 14, 2017, 6 pages.
United States Patent and Trademark Office, Final Office Action—U.S. Appl. No. 14/922,140, dated Jul. 27, 2017, 20 pages.
Wikipedia, *Digital Broadcasting*, https://en.wikipedia.org/wiki/Digital_broadcasting?oldid=561700228, 3 pages, dated Jun. 26, 2013.
Wikipedia, *Video Server*, https://en.wikipedia.org/wiki/Video_server?oldid=625054380, 3 pages, dated Sep. 11, 2014.
Wikipedia, *Metadata*, https://en.wikipedia.org/wiki/Metadata?oldid=630377108, 10 pages, dated Oct. 20, 2014.

\* cited by examiner

Examples of Advertiser(s) Associated with the Identified Objects

- Object 1(white dress): 3 Advertisers: A, B, C
- Object 2(sunglasses): 1 Advertiser: D
- Object 3(black tie): 1 Advertiser: E
- Object 4(light green clutch): 3 Advertisers: F, G, H
- Object 5(gold bangles): 2 Advertisers: A, G
- Object 6(gold belt): 1 Advertiser: J
- Object 7(white/silver bag): 4 Advertisers: R, S, T, V
- Object 8(large yellow ring): 6 Advertisers  D ,K, M, N, P, Q--Real Time Bidding

FIG. 3

Retailer "R"
COACH* The Carly Bag
(white/silver)
$442
*Exclusive offer!*
Matching silver shoes with the bag for one low price!
Offer valid for the next 48 hours
Offer valid in store or online.
Click Here for more details

Retailer "S"
COACH* The Carly Bag
(white/silver)
$349
*Special price just for you!*
Only 8 left in stock.
Available online
Shipping and Handling included
2 day delivery
Click Here for more details

Retailer "T"
COACH* The Carly Bag
(white/silver)
$298
Available online or in store.
Shipping and handling not included Click Here for more details

Retailer "V"
COACH* The Carly Bag
(white/silver)
$323
Try it on! See how it looks!
Located 4.7 miles from you View Map Click Here for more details

FIG. 5

VIEWER-INTERACTIVE ENHANCED VIDEO ADVERTISEMENTS

CROSS-REFERENCE TO RELATED APPLICATION

This application is a non-provisional patent application that claims benefit of co-pending U.S. Provisional Application Ser. No. 61/930,438, filed Jan. 22, 2014, the contents of which are hereby incorporated by reference.

BACKGROUND OF THE INVENTION

1. Field of the Invention

The present disclosure relates to monetization of the presentation of video material to viewers.

2. Description of the Background

TV programming and videos are an integral part of daily life; examples include nightly news, movies, comedy shows, drama shows, reality TV, musicals, a movie on a DVD, YouTube etc. (collectively referred from hereon as Programs). Videos can also be viewed over the internet, some are streaming and others are retrieved and displayed. With the advent of YouTube, growth in wireless bandwidth, wider usage of smart phones, tablets, other wireline and wireless devices, smart TVs, state of the art gaming consoles etc. the conventional definitions have somewhat blurred among various delivery mechanisms. The same holds true for viewing devices. Most videos are monetized in the form of the revenue generated via the advertisements while some are supported by subscription services such as Hulu, Netflix and others. Historically, advertisements generally appear at the beginning, and often in the middle of a video and sometimes at the end as well. In the case of on-line viewing, a viewer can typically click on the ad and he(s)he is taken to a landing page of the advertiser, whereas in the case of watching TV, the ads are not clickable by the viewer even though many TV sets are directly or indirectly connected to internet these days.

Limitations of the Existing Systems

Consider a popular sitcom today: there are one or more entities involved in the effort of making it available for consumer viewing, such as producers of the show, TV Networks such as ABC/CBS/NBC, distribution channels such as Cable, Fiber, Satellite companies and wireless networks, Internet service providers, subscription based services such as HBO, online delivery companies such as Netflix, on-line video providers, and local stations (a combination of one or more such entities are collectively referred from hereon as Content Provider). The primary means to monetize such programming are advertisements (also referred to as ads) and the revenue so derived is typically shared among Content Providers. In general the ads are shown prior to the show starting, during the show and towards the end of the show. However, the content part of the show remains largely un-monetized.

The above mentioned sitcom for example can be viewed these days by a viewer on-line or otherwise, on TV, or a tablet such as an iPad, or a computer, or a smart phone, or a video game console, and many other wireline or wireless devices collectively referred as Viewing Devices.

Content Related Limitations

Consider an example of a viewer watching The Bachelor, a reality TV show competition; a participant's dress catches her eye. The viewer is interested in learning more about the dress and its availability for purchase, but she has no easy way to find out. She only knows what it looks like, but she doesn't know its designer, price, and where it is available online, or in a store near her. Another example is of Modern Family, a popular sitcom on ABC network. One of the characters is playing a guitar in a particular scene (more specifically in a frame or a sequence of frames) and a viewer likes the guitar and wants to learn more about it; unfortunately, here too the viewer has no easy way to find the relevant information. The same applies to many other products (please note that "product" and "service" are used interchangeably herein) in a scene, such as shoes worn by a cast member, a wedding dress, a handbag, a car, a chair in the background, a decorative piece on the wall, a model of a cell phone or an app that a character uses to perform a task and so on. A typical option for a viewer will be to search on an internet connected device (could be wireless or wireline) and hope that the information is available since unfortunately, hardly any information is available for most such Objects (Object is a broad term that could be product, service, location, human, animal, plant, and fictional variations thereof, and so on). To learn more also requires effort on the part of the viewer to search, examine the results and painfully sift through them to find the relevant information assuming that it is even available.

This current challenge is compounded further when the viewer may not want to stop watching, but remains interested in learning about the Object(s) of interest such as dress(es) and/or shoe(s). In that case, he or she will have to either vividly remember the details, or take time to make a note about the Object and its description and perform the search later. If a product specifics are unknown, as that may be the case for most Objects, it may be quite difficult and frustrating, if not nearly impossible, to learn more. Another alternative is to record the Program for example on a DVR, and go back and find the desired frame containing the Object(s) later. Yet another alternative is to find the Program on-line later (assuming it's available), find the right frame, and then take notes.

Another example of an unfulfilled desire of a viewer would be if the viewer likes Kim Kardashian's hairstyle while watching the popular show Keeping up with the Kardashians and would like to know instantaneously how to recreate that specific hairstyle, the name of the hair style, which styling products were used and hair color. Unfortunately, it will be nearly impossible to find out immediately since such information is generally not available for days, if not weeks or months.

Consider another example when a viewer watches a movie and a beautiful golf course is seen in the backdrop. The viewer would love to find out which golf course is shown, where it is located, the course architect's name, the course's history, and any tournaments that have been played there and so on. However, he or she faces the same problem as described in previous paragraphs, which is the lack of information availability.

In yet another scenario, a gorgeous beach is the backdrop of a music video and a viewer would like to plan a trip to the beach with his wife on their anniversary. The viewer is interested in knowing more about the beach's location, the travel options, how expensive it is, what the lodging facilities are and so on. It's highly unlikely that he would be able to find such information without extensive efforts.

Sometimes while watching a Program one merely wishes to learn more about the subject being discussed. The viewer may not want to actually buy anything. For example, a viewer may be watching a Program on The History Channel about World War I and the viewer wishes to learn more about one of the generals shown or a battle tactic used. Today they must remember the name of whatever interested them, the context, and then search for it later. This is not only time consuming, but they are also unable to take away as much from the Program and the viewer's desire to learn is partially thwarted.

Another example, a viewer watches Arrested Development Season 4 on Netflix and watches Buster Bluth, one of the characters, eating a cupcake; the viewer is interested in that cupcake and would like to find out if it is available locally or if he can order it. Unfortunately, the viewer will have to conduct an independent search and the odds are low that he will be able to find it.

During an hour long prime time TV program, 40 minutes are typically for content and 20 minutes are for conventional ads. Thus, two thirds of the viewing time during a Program is not monetized for the most part. (In the case of on-line video viewing, the ratio of content time over advertisement time varies widely; however, the basic challenge of non-monetization of content remains the same). This inability to provide relevant information and/or consummate one or more transactions in response to a viewer's interest in one or more Objects in one or more frames, results in severely constraining additional sources of revenue for the Content Providers. The manufacturers, suppliers, retailers, information providers, distributers, and/or service providers of the Objects (collectively referred as Merchants) are also deprived of a potential customer. Continuing with the examples above, In spite of viewers' interests in dress worn by a participant in The Bachelor, or a guitar or a handbag in Modern Family, or hair style on Keeping Up with Kardashians, or a cupcake in Arrested Development, or a golf course in a movie, or a gorgeous beach in a music video, neither the Content Developer nor the corresponding Merchants benefit and are therefore deprived of a massive opportunity.

Despite providing likable and relevant Objects in a Program, a very large percentage of Object providing Merchants in the Program do not advertise or cannot afford to advertise during conventional ad time slots and unfortunately remain disconnected with the viewers and fail to capitalize in the form of direct potential feedback and/or transactions. To make matters worse, an Object's relevance to viewers typically diminishes over time, for example, a cell phone may no longer be available when a rerun of an episode is shown two years later. Furthermore, such Merchants not only remain unaware, but are also unable to target or follow-up with interested viewers with their respective product(s).

One of the most popular video viewing sites is YouTube; video providers place their video here and when a viewer watches said video, Google monetizes it by inserting ads before, during or sometimes at the end of the video. Generally the video provider does not share in the revenue derived by the advertising. For example, an amateur moviemaker uploads his/her short film on YouTube in hope of attracting many viewers, and has decent success; even then, while the video will get branding and recognition, there will be no direct monetary benefit to the movie maker. Thus many talented individuals, groups, and small companies are unfortunately deprived of payments on their successful content creation.

Advertisements Related Limitations:

There are many similarities and some differences in the limitations between conventional TV/video advertising as opposed to on-line advertising. The principal difference is that during on-line viewing an advertisement can be clicked.

Conventional TV/Video Advertising Related Limitations:

Time slots are sold to various advertisers in the advertising segment of a Program. However, the Objects within the frame(s) of each such advertisement remain flat since no additional information is specifically available about any Object. Consider a case in which, the well-known department store, such as Macy's, is advertising a large sale and a frame contains various clothing items and appliances. A dressy shirt catches a viewer's eye in particular, but, to learn more about it, she has to independently go to the Macy's site online at that moment, or later (requiring that the specifics are remembered by the viewer) and search through all the shirts on the website. A time consuming effort indeed to find the specific Object of interest. Furthermore, she can make a trip to Macy's, but there is no way of knowing, if that shirt will be on the floor in the Macy's store she chooses to go to. So the viewer is frustrated and Macy's also lost a customer.

Another widely known difficulty is that many viewers record their Programs of interest and fast-forward the ads which diminishes the expected impact of such ads and reduces the ROI (Return on Investment) for the advertisers. The fast forwarding has also made measurement of an ad's viewership much more difficult to determine. Some efforts have been made to force viewers to watch the ads by not allowing them to fast forward, but these have not had much success.

Another challenge is that the ads may change between conventional TV viewing and on-line viewing. For example a viewer watches Saturday Night Live (SNL) on his TV when it first airs, and saw an ad of a man's cologne that interests him, but continued watching the show and forgot the cologne's name. When he goes online to review the episode of SNL the next day on the NBC website to look for that cologne, the advertisements are different and the viewer is unable to capitalize on his interest and is disappointed and/or frustrated. The Merchants also miss out on this monetization opportunity.

Another challenge is that the advertising during a Program is determined by the advertisers on the basis of aggregated viewer demographics and its suitability to one or more of their business goals. However, the ads shown are largely disconnected from the content of the show itself. For example, an analogous situation would be an individual who goes to the Air and Space Museum in Washington D.C. After going through the exhibits and the whole museum, the individual goes to the gift shop. At the gift shop all the products being sold are unrelated to Air and Space; the products are an eclectic mix of items from all categories instead.

Yet another limitation is that the advertisers for each slot are determined in advance and have no ability to pick and choose a viewer in real-time based on his/her unique profile (or profile of a small group of viewers, such as a family, watching together).

To summarize, similar to Merchants, the advertisers also are quite constrained as there is no direct measurable viewer feedback during or immediately after the Program. The advertiser also does not have the ability to go back and access the interested viewers through other available channels.

The above described limitations are persistent regardless of whether the Program is being aired for the first time or it's a rerun. For example, a 4-year-old rerun of a popular comedy Big Bang Theory on another TV channel would have different ads than the ones shown during its original broadcast and the monetization in general through the new ads is lower.

Similar limitations exist for example when a DVD (a generic term used for DVD, Blue Ray disc, and other such media) of a movie is sold to a consumer. Generally there are no ads in middle of such a program although it may have ads at the beginning or end. There are two challenges with such an advertising strategy. First, the ads get stale with time and may no longer be relevant. For example, an ad for a winter coat while the movie is watched in middle of summer, or, even worse, three years later when the merchant may have gone out of business. The second challenge is that ads at the beginning or end are usually skipped. Thus, the ads in this case generate little revenue, if any, for the Content Provider and the selling price of said DVD is the only means of monetization. The above also applies to other applications such as video game cartridges or video game DVDs.

The challenges are even more acute for Content Providers such as HBO who do not show any ads in return for charging a subscription fee, which becomes their only means of monetization. Those providing on-demand TV or pay per view also suffer from similar challenges.

On-Line Video Advertisement Related Limitations:

On-line viewing also largely suffers from the same difficulties although there are some differences. Specifically, during on-line viewing, unlike the content, an advertisement can be clicked and the viewer is able to go to a landing page; however, the viewer may still be forced to do his/her own search to find the specific Object of interest in the ad which may not always be the Product advertised. Consider an example in which a movie is being advertised to a viewer in middle of watching an on-line video. The viewer may not be interested in the movie, but is interested in a boat that is in one or more frames of the ad, yet the viewer has no recourse except an independent search that may or may not provide the answer.

When an on-line viewer clicks on an ad frame and taken to a landing page, the Objects within the frame(s) still suffer from the same limitation as above. Continuing with the example of Macy's, which is advertising a large sale and a frame contains various clothing items and appliances. A dressy shirt catches a viewer's eye in particular and her click leads her to a landing page. Unfortunately, she still has no easy way to find the shirt without browsing through almost countless options—a time consuming effort. Alternatively, she can make a trip to Macy's, but there is no way of knowing, if that shirt will be on the floor in the Macy's she chooses to go to. The result is that the viewer has frustrating experience and Macy's also lost an opportunity to sale. To summarize, viewers, Merchants, Content Providers and advertisers all suffer from the serious limitations as outlined above.

In general, the content of the video itself, such as a TV sitcom, whether viewed on-line or on TV remains largely un-monetized, and the conventional advertisements are the major means for revenue generation. As an example, a 30-minute show may have 20 minutes of content and 10 minutes of advertising. The 20 minutes of content is largely un-monetized. What is needed is a solution that substantially enhances the monetization of such videos and TV programming, recent and vintage.

SUMMARY OF THE INVENTION

Systems and methods are provided whereby a viewer's selection of an object that is displayed in a video image results in information about that object being provided to the viewer. In preferred embodiments, a viewer's selection of an object that is displayed in a video image can result in an advertisement about the product or service that is represented by the object being provided to the viewer. In particularly preferred embodiments, the display of an advertisement about the product or service that is represented by the object can allow the viewer to purchase the product or service.

In certain embodiments, a user's selection of an object that is displayed in a video image results in the display of information to the viewer about that object. In preferred embodiments, a user's selection of an object that is displayed in a video image can result in the display of an advertisement about the product or service that is represented by the object. In particularly preferred embodiments, the display of an advertisement about the product or service that is represented by the object can allow the viewer to purchase the product or service. In one embodiment, a system is provided comprising a viewing device; a viewer interface device that is operably connected through at least one network to at least one content provider; at least one server comprising a data storage device; at least one advertisement computation engine wherein the viewing device is capable of displaying a video image and wherein the viewer interface device can accept viewer input to allow the viewer to select a video frame or a portion thereof. In certain embodiments of the system, the viewing device is operably connected through at least one network to at least one content provider.

In certain embodiments, the system comprises a Viewing Device 730, one or more viewer Interface Devices 720, each operably connected through at least one Network 740 to one or more Content Providers 750, Object Advertisers 754, or Frame Advertisers 758 that, in turn, are operably connected to one or more Servers 760 or virtual servers in the cloud, as exemplified in FIG. 7A. The viewer Interface Devices 720, Content Providers 750, Object Advertisers 754, or Frame Advertisers 758 can be operably connected, directly and/or indirectly, via one or more Networks 740, which may include, but are not limited to, a local area network (LAN), a wide area network (WAN), a cellular network, a satellite network or, preferably, the Internet. In certain embodiments, each Server 760 comprises a microprocessor configured for processing computer-executable instructions and one or more data storage devices connected, directly or indirectly, to the microprocessor. The Viewing Device 730 is operably connected, directly and/or indirectly, to Content Providers by one or more Networks 740, which may include, but are not limited to, a local area network (LAN), a wide area network (WAN), a cellular network, a satellite network or, preferably, the Internet. Preferably the connections of the Viewing Device 730 are bidirectional.

A Server 760 is operably connected to an Advertisement ("Ad") Computation Engine ("ACE") 770. Due to the high bandwidth required by video transmission and video streaming over the Internet, the ACE is optimally implemented in high speed specialized hardware adapted to processing video signals. Less preferably, the ACE can be implemented in software.

While the ACE is associated and typically reside with an Object Advertiser and/or Frame Advertiser, this is not necessarily true in all cases. FIG. 7A illustrates a number of embodiments for the connection of an ACE to a Server. The ACE may reside with the Content Provider in case it is acting as an Object Advertiser. For example, ABC Network may advertise one of its own Programs during another of their Programs. In another embodiment, a Content Provider may source the data from one or more Object Advertisers and/or Frame Advertisers, collate the data in the desired format, and acts as the ad server with associated ACE. In further embodiment, the ACE functionality could be split across two physical and/or virtual engines, one residing with a Content Provider and another with the Object Advertiser and/or Frame Advertiser, working together. In yet another implementation, a physical machine may contain multiple virtual ACEs. In an alternative implementation, the ACE may reside at a third party such as a Demand Side Provider on behalf of a corresponding Merchant. In another embodiment, Object Advertiser and/or frame information provider functionality may reside with the Content Provider.

In certain embodiments, the viewer Interface Device 720 can also function as a Viewing Device 730. See FIG. 7B. Viewer Interface Devices 720 may include, but are not limited to, personal computer, a mobile phone, a smartphone, a laptop computer, a notebook computer, a tablet computer, Google Glass, a smart remote control, an eye tracker or another hand-held device. Preferably, the system is functional to present images, preferably to stream video to the viewing device. The system can accept viewer input. In preferred embodiments, the viewer input is provided by a mouse, a track pad, a touch screen, or other suitable pointing device.

In certain embodiments, the system can correlate the viewer input with a position on the image displayed on the viewer interface device that corresponds with a pre-defined Object within the image. The Object is associated in a database with information, or links to information, corresponding to one or more of a product, a service, a retailer, an advertiser, a mapping application or a secure transaction application.

In other aspects, a method of providing advertisements to a viewer in the context of a video being viewed by the user. In a preferred embodiment, the method includes the steps of providing a video to be displayed on a Viewing Device; accepting viewer input related to a position on the display of the viewer Interface Device; correlating the viewer input to a position on the video frame being displayed at that time; correlating the position on the displayed video frame with a determined Object within the displayed video frame; providing the viewer with information, or links to information, corresponding to one or more of a product, a service, a retailer, an advertiser, a mapping application or a secure transaction application.

The above described and other features are exemplified by the following Figures and a detailed description.

BRIEF DESCRIPTION OF THE DRAWINGS

The foregoing and other features and advantages will be apparent from the following more particular description of exemplary embodiments of the disclosure, as illustrated in the accompanying drawings, in which like reference characters refer to the same parts throughout the different views. The drawings are not necessarily to scale, emphasis instead being placed upon illustrating the principles of the disclosure.

FIG. 3 lists examples of advertisers associated with the identified Objects of FIG. 2.

FIG. 5 illustrates four examples of retailer's ads that are associated with the selected Object 7 including links to internet sites that provide further details of the offers, and the opportunity to purchase, in a secure transaction, a product or service represented by Object 7.

DETAILED DESCRIPTION OF PREFERRED EMBODIMENTS

Figure 1:
FIG. 1 is a schematic diagram of an exemplary video frame.
Figure 2:
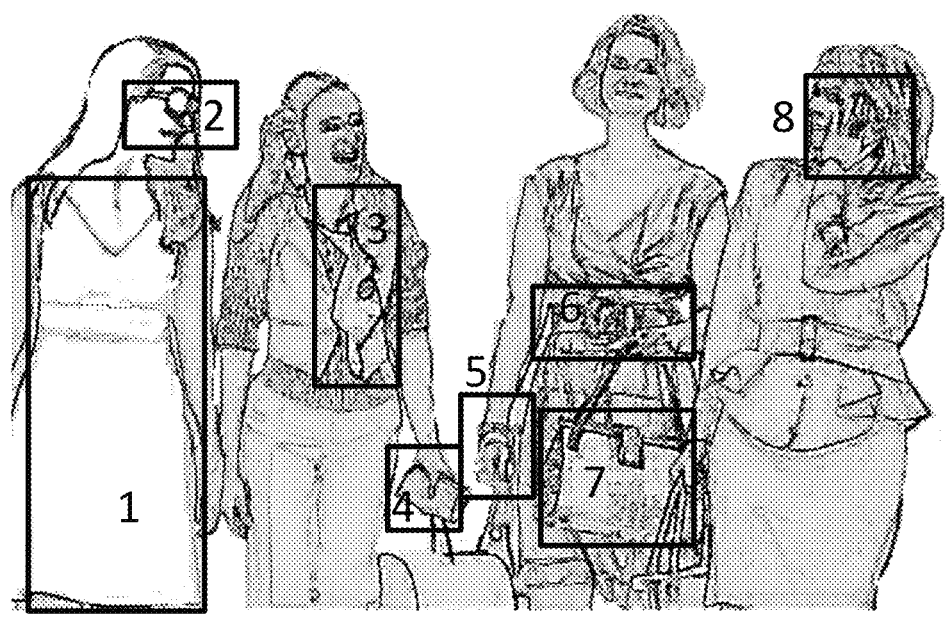
FIG. 2 is a schematic diagram of the video frame of FIG. 1, showing eight examples of Objects that have been identified in the video frame by the content provider.
Figure 4:
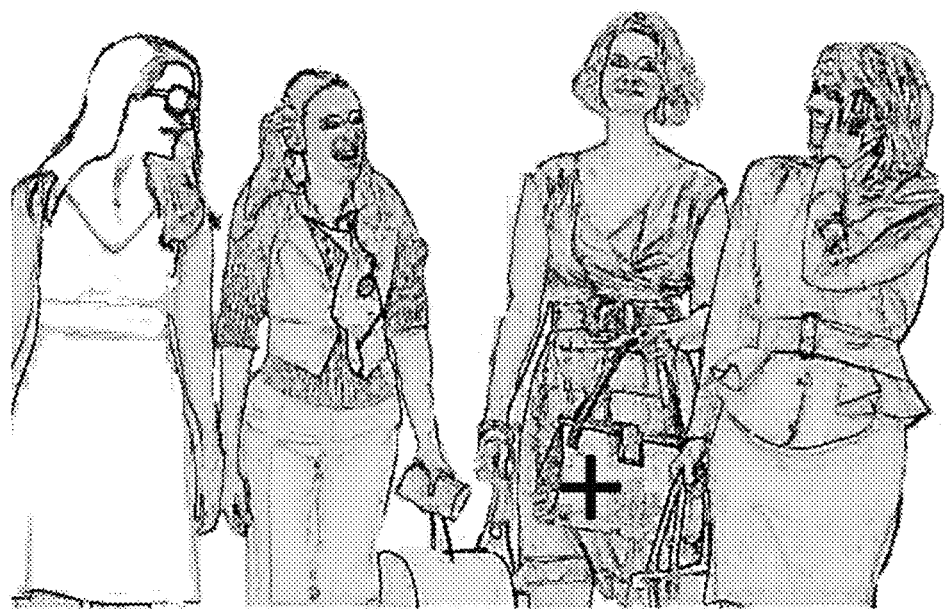
FIG. 4 illustrates an example in which the viewer has selected an Object of interest, the white and silver bag, Object 7.

Enhanced Video Advertisements (EVA):

In this invention, one or more Objects in one or more frames as shown in FIG. 1 of a Program/video/on-line video are uniquely identified by the Content Provider as shown in FIG. 2. Each such Object can then be associated with one or more participating Object Merchants as shown in FIG. 3. As the Objects appear during the Program, the viewer has the ability to select one or more desired Objects per frame or the frame(s) containing them as shown in FIG. 4. Similar to the association of Objects with a frame, one or more frames can also be associated with one or more participating Merchants. As such frames appear during a Program, the viewer has the ability to select one or more such desired frames. Such selected Object(s) and/or frame(s) are then automatically saved.

The saved frames and/or the Objects can be viewed later for further follow-up by the viewer at his/her convenience. Alternatively, if a viewer desires to learn more about the Object(s) and/or frames of interest immediately, the viewer can pause the Program (or watch while the Program is live), learn more in real-time as shown in FIG. 5, and/or possibly transact if so desired, or decide to further review the Object(s) and/or frame(s) later, and/or subsequently resume (or continue) watching if interested. Another option for the viewer is to select one or more Objects and/or one or more frames and request that the information be sent for further follow-up. A viewer can also choose to do one or more such steps.

It should be noted that instead of each frame, the Object related information may be associated just once every few frames to optimize the viewing performance.

Similarly, one or more Objects in one or more advertisement frames during ad slots can be selected as above (assuming advertiser's consent). Similarly, one or more advertisement frames are also selectable. Thus, a seamless and markedly more enriching experience is achieved by the viewer while simultaneously enabling the Merchants, Content Providers, and advertisers to enhance their monetization.

The details of the disclosure follow.

Frame Enhancements:

The Content Provider (and/or other third parties) enhances the previously mentioned flat frame (flat in this context means just the images and corresponding audio without additional attributes, regardless of the number of dimensions associated with such a frame, for example frames in a 3D movie) by providing attributes that uniquely identify one or more Objects in a frame. Continuing with the earlier used example of a sitcom "Modern Family", a frame that has Sofia Vergara (playing the role of Gloria) holding a stylish handbag, wearing designer shoes, and carrying a slick cell phone in her hand ready to head out, all can be uniquely identified. If the frame also has a 60" Sony TV in the background and Rico Rodriguez (Playing the role of Manny) is playing a video game on the TV, then the TV, video game console and the game itself can also be identified as Objects. Another example is a cell phone app that Ty Burr (playing the role of Phil Dunphy) is using and that app itself could be an Object. Similarly both a coffee mug and the coffee inside of it could be two different Objects in which a mug may be a primary Object and the coffee in the mug is defined as a secondary Object. (Please note that for the ease of usage primary Objects and secondary Objects have been used interchangeably from hereon). It is not necessary that all Objects are identified in any given frame or that Objects are identified in each frame. These added attributes could be considered in making such frames multi-layered instead of flat. In an enhanced implementation these added attributes among others could also include one or more categories an Object is part of such as electronics, home entertainment, clothing, cosmetics, auto services etc.

Consider the magnitude of the challenge in assigning Object attributes: In the United States, presently a typical TV Program has 30 frames per second or 1800 frames per minute (A YouTube video may have 24 to 60 frames per second). For an hour long TV Program there will be 108,000 total frames. If, for example, there are 20 Objects per frame that need to be uniquely identified/attributed, then the total number of such Objects in the program will be 2.16 million, clearly a serious effort. It should be noted that unique Object identification/attribution per frame does not necessarily mean that the underlying Product (used here in a broad sense to include all types that are collectively identified as Object) is different in every case from one frame to next. In fact there will be considerable overlap, and the total unique number of underlying Products will be much smaller. Continuing with the Modern Family example, if a handbag used by Sofia Vergara appears for about 40 seconds, then this will equate to 1,200 frames in the case of conventional TV viewing. In the worst case the handbag has to be uniquely identified for each frame, thus 1,200 times. Even though, the underlying product, the handbag, remains the same.

Similar to Objects above, one or more frames are also identified and assigned attributes.

Viewer Interactions:

Consider an example of a viewer who admires the handbag in the Modern Family sitcom, and is interested in knowing more. She selects the handbag, for example, by using the cursor, a smart phone, a pointer, an eye tracker, Google Glass, a smart remote control, a finger on a touch screen, or a verbal cue etc. or other means or technologies as they evolve in the future. The viewer also has an option to select an entire frame as opposed to a specific Object as she may be interested in the decor of the whole room. Correspondingly, the frame and/or the selected Object, a handbag in this example, are automatically saved. The viewer can also select multiple Objects in a frame or across frames or multiple frames during the Program and such are automatically saved as well. In common embodiments, Viewing Device has direct or indirect Internet connectivity. The data saved could be at one or more viewer designated devices and/or locations, or may be automatically defaulted to a location established by the Content Provider, or it could be in the Cloud, or in some cases stored at the Viewing Device itself for later transmittal to Merchants as and when Internet connectivity becomes available and so on.

The saved Object(s) and/or frame(s) can be viewed later by the viewer at her convenience allowing her to continue watching the Program uninterrupted. The saved information could be saved until the viewer deletes it or the information could have a time-to-live timer associated with it or variations thereof. Continuing with the Modern Family example, the viewer may only be interested in the handbag but may have saved the frame to gain a better perspective of the overall look of Sofia Vergara. The viewer can then select the handbag in the frame, and is provided with the associated information. The source of the associated information could be a retailer such as Nordstrom and/or the manufacturer of the handbag such as Coach, Louis Vuitton, Tory Burch, etc. In either case, they are acting in the capacity of an Object advertiser. The information may include one or more relevant specifics such as price, availability, manufacturer, supplier, views of the handbag from various angles, availability in a local store within a certain distance, other available handbags, any on-going sale, related accessories, any points that can be earned, how long the offer is valid, one or more URL and so on. In a further enhancement, the information provided such as price, shipping duration etc. could be customized by Object advertiser to the viewer profile. The ability to select the desired Object (and learn about it at a convenient time) while watching a Program makes Object advertising more relevant to the viewer as opposed to the ads during the conventional advertising slots which may or may not have any relevance to the content being watched or the viewer.

After viewing the Object's specifics the viewer can decide to proceed forward and consummate the transaction, or save it in a shopping cart for further consideration, or leave it as is and make no decision, or decide not to move forward, and/or share the Object with others, etc. This helps the Object advertiser to get valuable feedback about the level of interest in the viewer community. This also enables the Object advertiser to target the viewer going forward and also update his/her profile. Continuing with the example of Modern Family, a viewer liked the handbag Sofia Vergara was carrying and selected it. Then a few minutes after the sitcom ended, she reviewed the information received from one or more advertisers. At that point she could put that handbag in her shopping cart; or she could also complete the transaction, share the handbag information through social media, or do nothing. In another example, the viewer saw a golf course in a movie as a backdrop and selected the frame. Sometime later, the viewer reviews the information received from one or more frame Advertisers about the golf course, the travel options, the lodging facilities, other attractions in the area etc. and corresponding offers. At this point the viewer can decide to proceed forward and take some action such as making travel and lodging reservations, or hold onto the information for another day, or share the information with other individuals, or do nothing, etc.

Another viewer who admires the handbag and shoes and is interested in knowing more instantaneously; selects both the handbag and shoes, or the frame containing them as described above. However, as the viewer is interested in learning more about the handbag and shoes immediately, the Program is paused, and the information associated with the selection is shown. An alternative is to open another window to view the desired information and continue watching the sitcom simultaneously. If a frame containing the Objects is selected, then the viewer can hover over one or more Object(s) of desire and is provided with some information as he(s)he moves from one Object to another. The viewer can then select the handbag or shoes and get much more detailed information as described above. Alternatively, the viewer can select the handbag directly without having to hover over the handbag and is taken to the window with the relevant information as described in the previous paragraphs. Subsequently the viewer could hold it for further viewing and/or decision making at another time, or he(s)he can consummate a transaction, etc. Then, the viewer can resume the viewing if it was paused, all seamlessly executed. This process also helps the Object advertiser measure the viewers' interest as the advertiser gets real-time feedback and ability to subsequently target the viewers more effectively. Although the example above is described for selected Objects, it also applies to selected frames for example in the case when a golf course described in earlier paragraphs was selected.

Yet another viewer who admires the handbag and is interested in knowing more selects the handbag, and the viewer requests that corresponding advertiser(s) send the information about the handbag for further follow-up. Such information is seamlessly delivered to the viewer at its designated place. Alternatively, in the case of multiple advertisers, an implementation may allow the highest bidding Object advertiser to send the relevant information, or variations thereof. The viewer can then view the information later at her convenience. Although the example above is described for handbag, it also applies to the example in the case when a frame with a golf course as a backdrop described in earlier paragraphs was selected.

Another alternative is that the viewer could activate a hovering mode in real-time and as it selects an Object, some information about the Object is shared on the screen as long as the Object remains in the frames while the Program is continuing. After viewing some basic information, the viewer has the option as described above to either pause the Program and have a closer look, or not pause and take a closer look, or decide to view it later, or request to have information delivered, or decide not to proceed, or do nothing for the time being, or any appropriate combination and variations thereof. This also applies to the example in the case when a golf course frame described in earlier paragraphs was selected.

In yet another alternative, the viewer can configure to save Objects by category. For example, a viewer may be interested in every Object marked as a dress during the Academy Awards. In this case, all Objects identified with the "dress" category and/or corresponding frames are automatically saved without requiring the viewer to select them as they appear on the screen, and/or the viewer can request that the information be sent to her as described in previous paragraphs. It should be noted that this mode does not prevent the viewer from selecting additional Object(s) and/or frames as described in the previous paragraphs. For example, the same viewer may decide to select other Objects such as jewelry as well while watching the Program. Similarly, one could configure to save the frames by category such as Tourist Destination.

Continuing with the Modern Family example, if the viewer likes a handbag, she can further seamlessly share that interest with her friends through social media. A tweet about the frame or the handbag can be auto generated if so desired at any point of time including but not limited to while hovering on an Object of interest, selecting an Object, while viewing the information, posting the consummation of the transaction and so on. The frame(s) and/or Object(s) could also be automatically or seamlessly shared through other social media channels such as Pinterest, Twitter, Tumblr, Snapchat, Facebook and others. Feedback from such sharing with social media can be monetized by the Content Provider for example by enhancing the content and to have better insight into the Program's demographics. It could also be used by frame and/or Object Advertisers for additional targeting.

Advertiser Interactions:

A real-time Ad Computation Engine (ACE) is used to support various scenarios outlined below in order to support Object and/or frame advertising, be it part of content or part of advertisements.

Each Object in a frame or a frame itself can have one or more advertisers associated with it. Such an association could either be static or dynamic. Static association implies that the same advertiser remains associated with the Object and/or frame for a predetermined duration although the corresponding advertising content may not stay the same. Whereas dynamic association allows different advertisers for the same Object and/or frame. Various scenarios are described below for Objects but apply to frames as well:

An advertiser can be permanently associated with an Object and the associated content also stays the same. Although relatively the simplest solution, it has number of disadvantages especially as the video ages and along with it likely the Object (for example the handbag used by Sofia Vergara in "Modern Family" may go out of fashion). In such cases the efficacy of the ad will go down as a function of time. There may be scenarios such as an Object being a tourist destination such as Maui and in that case the content may have higher longevity. One of the advantages is that the Object advertiser gets the guaranteed spot for a long time and the Content Provider in return has a long term contract with little if any on-going effort on its part.

An advertiser can be permanently associated with an Object; however, the advertiser is able to update the associated content. This to a degree reduces the aging issue. Consider an example in which a character is drinking coffee from a mug that has Starbucks written on it and that mug has been defined as an Object. When viewers click on it over a period of time, they may see updated ads. If someone saw a rerun of a TV sitcom three years later (on-line or otherwise) and selected the mug, the Object ad itself will be relevant and may contain the current promotions. The advantages are that the Object advertiser is able to provide more relevant ad content and has a potentially long term contract. Furthermore, the Content Provider also benefit with increased revenue although at somewhat increased cost as it is required to provide the requisite services to support the ad content update. This capability also helps generate enhanced revenue and to a large degree negate the effect of aging. For example a movie on DVD that may be 3 years old but it will have Object related ads that are updated. In a further enhancement, conventional ad slots could also be introduced if desired by the DVD provider for additional revenue and such conventional ads could also be updated as a function of time.

Alternatively, the Object advertisers could be different for the same Object over a longer duration. Continuing with the "Modern Family" example, the shoes worn by Sofia Vergara are defined as an Object. The shoes may initially have retailers Nordstrom and Lord & Taylor associated with it when the show airs for the first time; however, the reruns syndicated a year after its first airing may have Macy's advertising for the same Object. It should be noted that the Object advertiser drives the advertisement content and as time goes by and that particular pair of shoes go out of style, the advertiser may advertise new lines of shoes. This allows the Object advertisers to optimize one or more of their business targets such as revenue, profit, inventory etc. in a desired window of time. As an example one or more Object advertisers may be interested in selling their shoe inventory this season whereas another one or more Object advertisers may be more interested in the long tail (and as a result typically has lower advertising cost) with shoes that may not be the same as the Object related but along similar lines. The Content Provider also benefits if the show has a strong viewership for reruns then it can charge more money than usual even in later years instead of committing all the Object related ad opportunities at the front end itself.

In another alternative, Object advertisers could be different even in the short term. For example, an advertiser may associate itself with an Object only for a specified geographical location such as California and Oregon if the advertiser is only active or is interested in attracting customers from only those two states. Another example is that of a restaurant with only a few locations within a state. In another embodiment, an Object may be associated with multiple advertisers, randomly assigned in a pre-defined percentage of viewership. In yet another embodiment, if an Object appears multiple times during a program, the Object could have different advertisers associated with it. For example, a cellphone is shown on screen 4 times in a Program and different service providers could be associated with the same cell phone. In another embodiment an Object advertiser may only be interested in users who are viewing the Program on a certain device(s) such as an iPad, iPhone, Android phones, Android tablets, a specific gaming box, or a DVD player, or it may be interested in all viewers except those watching the Program from a specific type of tablet. Thus there could be various ways and channels the association of an advertiser with an Object could occur.

Alternatively, an advertiser may only want to be attached to an Object, subject to a viewer profile meeting pre-defined criteria. In the case of the handbag example from Modern Family, the Object advertiser may not be interested in a viewer who is male. In the example of women's shoes, the Object advertiser may only want to target female viewers under 35 with an annual income above a certain threshold. On the other hand a video game console supplier may only want to target those viewers who are under 18 and male. In an enhancement, the criteria itself could be changed in real-time to further optimize the results. Such profile-based advertising maximizes the return for the Object advertiser, yet allows the Content Provider to sell the Object related ad opportunities more widely.

The above is further enhanced by allowing multiple advertisers for the same Object who may desire different demographics. Consider an example in which the Object is a pair of shoes that multiple Merchants wish to associate with as an Object advertiser. All the advertisers are large department stores carrying that brand; however, each has different demographics in mind. A viewer's profile is compared against each of the Object advertisers' requirements and that viewer will see the Object advertiser with whom her profile matches the most. This optimizes each of the advertiser's targeting while enhancing the revenue stream for Content Providers.

It should be noted that one or more advertisers are allowed to be associated with the same Object at the same time for the same viewer for the various scenarios described above. The viewer has the option to pick and choose.

In another enhancement, real-time bidding occurs amongst competing Object advertisers who desire for the same viewer profile. In this case once a viewer has selected an Object, his/her profile is shared among the interested advertisers in real-time. Subsequently, those advertisers (or third parties on their behalf) who are interested can make a bid. The actual real-time bidding process could be just a single bid auction or multiple iterative bids until there is only one bidder left with the best bid, or variations thereof subject to the implementation. The winning bid then gets the right to advertise for the selected Object. This also enables more refined targeting and/or bidding by an Object advertiser as the bid amount for each viewer among other things could also be dependent on the advertiser's one or more business targets and their respective status at that time. This also maximizes the return for the Content Provider. In an alternative, multiple advertisers could be allowed, for example, the top three bidders could advertise to the viewer for the same Object at the same time, etc. The actual auction process is controlled by an auctioneer that could reside with a Content Provider or a third party.

In an example discussed earlier a moviemaker who uploads a video to YouTube does not usually get to share in the revenue when ads are placed by Google. This novel innovation allows such video providers to identify one or more Objects and such Objects could then be associated with advertisers in ways as described above. The level of interest and the payment from the Object advertisers to the video provider will likely go up as the popularity of the video increases. Consider an example of a successful YouTube Video that shows "How to apply eye shadow". In this instance the creator may have multiple cosmetics merchants competing to advertise for each Object. Subject to implementation, one or more Object advertisers may be allowed as described in previous paragraphs. The key advantage is enabling the video provider of such a video to economically share in the proceeds instead of just Google and/or those offering similar services taking most, if not all, of the generated revenue. This proposed novel solution democratizes the ad monetization and funds additional creative activity as well.

Frames in a conventional advertisement time slot (typically 30 seconds) that have already been bought by an advertiser, for example, Macy's also offers opportunities to provide a more effective and/or targeted advertisement for each Object included in the ad. In the conventional TV advertising industry, a linear sequence of commercials is called "POD", and within each POD each commercial is uniquely identified by its POD number and its location within that POD. Consider a frame in a Macy's commercial that contains clothing and appliances with one or more of them defined as Objects. As a viewer selects one or more such Objects, he(s)he is provided with relevant information and can seamlessly follow-up in various ways as described earlier in the document. An additional benefit is enhanced viewing of conventional ads and a lesser likelihood of an ad being bypassed even when a Program is watched on DVR or equipment with similar functionality, etc. It should be noted that an Object advertiser's right to advertise could be limited to that commercial in a POD, or multiple commercials in the same POD, or commercials within multiple PODS but not all, or within all the PODS during the Program. In the case of on-line viewing while the conventional ads can be presently clicked for additional information, Objects within a frame of the ad are not. The present disclosure addresses this serious limitation.

In an enhanced version, while Macy's may pay for the ad time slot, it may be able to simultaneously collect revenue from the Merchants providing the Objects due to enhanced Object level advertising in addition to the frame level advertising. This effectively reduces the ad cost for Macy's while allowing the Merchants to gain increased visibility. In another business model, the Content Provider may also share in part of such proceeds as well thus making it win-win for the parties involved.

In another scenario, Objects could be defined in a frame and yet may not have an advertiser associated with it but relevant information is. As an example, there is a Program on PBS (Public Broadcasting Station) about the history of a castle in England. When a viewer selects an Object in a frame, the viewer is sent more information related to the Object, but is not necessarily sent advertising information. The information the viewer receives is only educational. In this context the entity providing the information may be considered Object Information Provider.

Figure 6:
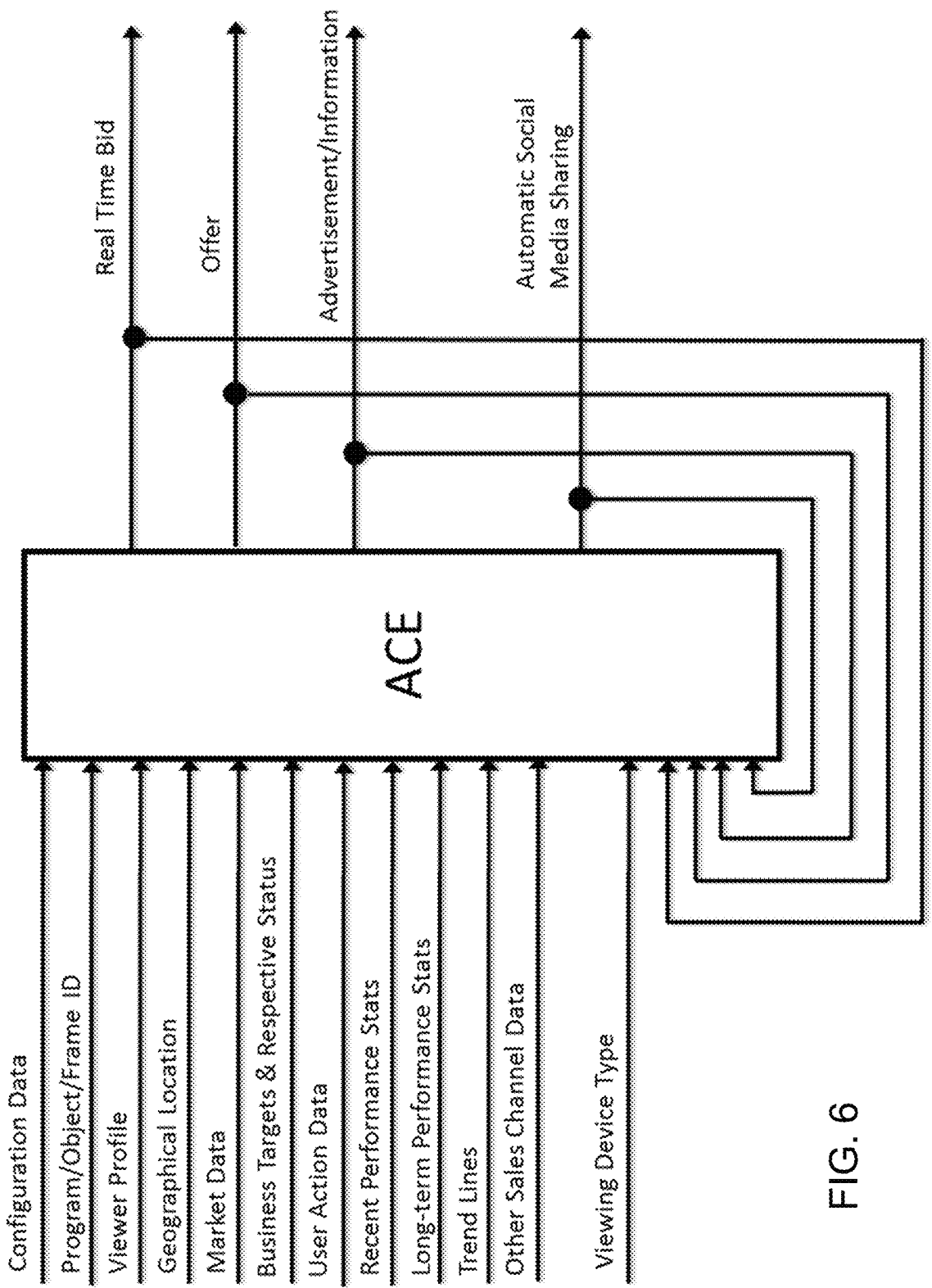
FIG. 6 is a block diagram of the inputs and outputs of an embodiment of an Advertisement Computation Engine (ACE).
Figure 7A:
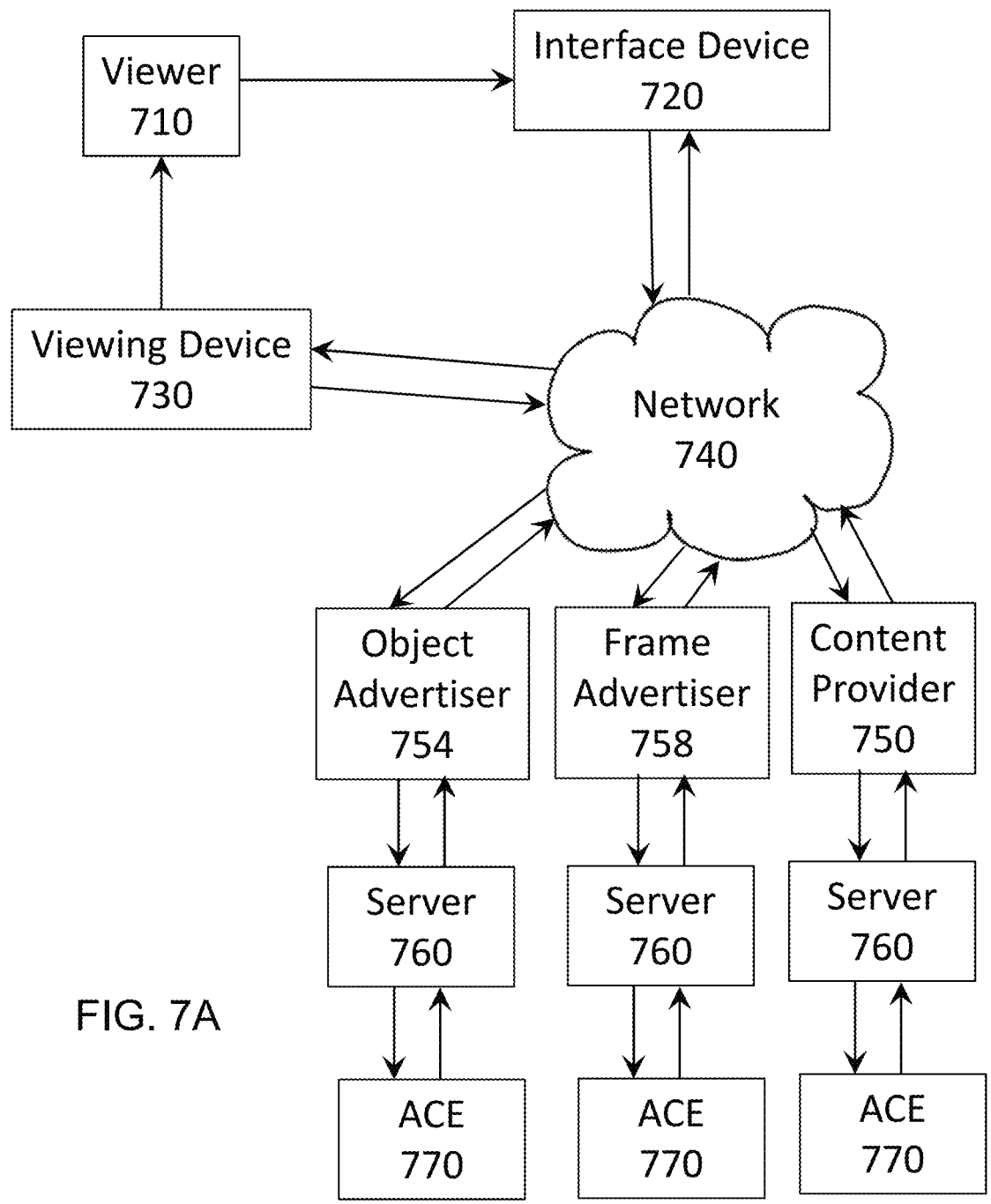
FIGS. 7A and 7B are schematic illustrations of two embodiments of the disclosed system.
Figure 7B:
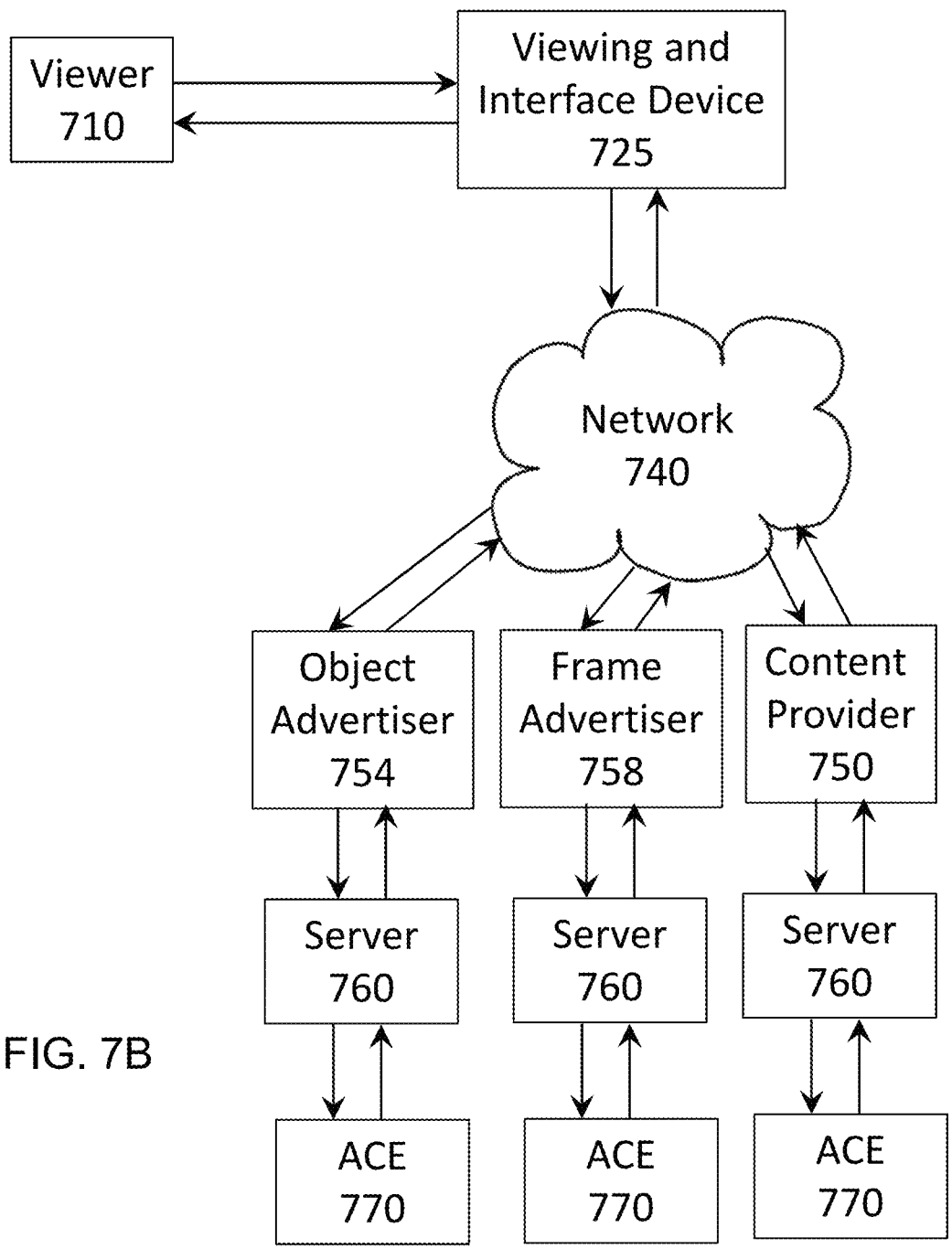

The Ad Computation Engine:

The Ad Computation Engine or Advertisement Computation Engine ("ACE") is generally associated with an Object Advertiser and/or frame Advertiser. A block diagram of the Ad Computation Engine is shown in FIG. 6. The ACE accepts multiple inputs. The exemplary inputs include configuration data, program/frame/object identifiers, a viewer profile, the geographical location of the viewer, market data, Advertiser's business targets and their current status, viewer action data, recent performance statistics, long term performance statistics, trend lines, other sales channel data, the viewing device type, etc. An ACE may also have a subset of such inputs.

The outputs include one or more of an offer to the viewer, a real-time bid, an advertisement and/or information, and/or automatic social media sharing etc. The outputs could also be fed back to the engine for subsequent usage as appropriate and described in detail below. Such an advertiser could support one or more Objects and/or frames. The ACE's key capabilities include one or more of the generation and/or formatting and/or structuring of the actual ad itself, computation of a customized offer subject to viewer profile, computation of a customized offer and/or (real-time bid) subject to viewer profile towards optimizing the corresponding advertising Merchant's one or more unique targets, and/or ability to seamlessly share the viewer's one or more desired Objects and/or frames through social media. The ACE uses one or more of an arithmetic unit, a rules processing unit, and/or logic unit for the requisite computations. The ACE's functionality may also include an ability to provide a unique ad for each viewer for an Object and/or a frame, an ability to provide a unique ad from one instance to next for the same Object and/or for the same frame, an ability to provide a unique ad from one instance to next for the same Object and/or for the same frame for the same viewer, an ability to provide a unique ad from one instance to next for the same Object and/or for the same frame for the same viewer in a Program, an ability to vary the ads from one Program to another, an ability to provide unique ads for the same Program displayed at different times (for example a viewer watching a rerun of a comedy playing a year later, or watching the Program on a DVR a week after recording it), an ability to vary the ads from one geographical location to another, ability to have different ads for different Viewing Devices (for example one ad for conventional TV watching versus another for an iPhone) etc.

Furthermore, the ACE may structure an ad according to a unique viewer profile. Consider an example where the viewer profile shows a middle income mother interested in an extremely expensive handbag such as a Birkin (a typical Birkin may easily cost north of $12,000). However, the viewer profile indicates that she is unlikely to buy that bag. So in this instance the ACE may not only provide the information about the handbag selected, but may also include other better priced handbags that may share some common design traits such as style, color, size, detailing etc. with the selected Birkin hand bag. The same holds true for the other items such as shoes. Ad structuring computations could also be performed by the ACE in a manner that optimizes an Object and/or frame advertiser's one or more targets. In a further enhancement, the ACE could be used to test ads to identify the optimized ad structuring for a unique profile, and/or for a profile representing a class of viewers, and/or a generic profile across some or all viewers.

The Object Advertiser and/or Frame advertiser's business targets could include a specific predetermined number of viewers matching its requisite demographics (and/or outside of the defined demographics) selecting one or more of its Objects and/or Frames for a specific Program, a specific predetermined number of viewers matching its requisite demographics (and/or outside of the defined demographics) selecting one or more of its Objects and/or Frames for a specific Program over a specified time, a specific predetermined number of viewers matching its requisite demographics in a specified time selecting one or more of its Objects and/or frames across one or more Programs, revenue, profit, inventory, market share, growth rate in a certain Product category such as Electronics or tourists from a specific geography, overall growth rate, etc. The computation of the customized offer may take into consideration current status of one or more such targets in the context of their corresponding over all targets. Additional inputs that can be factored in such computation may include the viewer profile, his/her geographical location, the number of times the ad has been shown so far for one or more Objects and/or frames in a given time for a specific Program and/or across Programs, the number of customized offers made so far for one or more Objects and/or frames in a given time for a specific Program and/or across Programs, the number of times one or more Objects or the frames containing one or more Objects and/or frames have been saved in a given time for a specific Program and/or across Programs, the number of times one or more Objects or one or more frames containing one or more such Objects, and/or frames has been instantaneously viewed in a given time for the specific Program and/or across Programs, the number of times information was requested and/or sent for one or more Objects and/or frames in a given time for a specific Program and/or across Programs, a ratio of actual transactions over number of times an Object and/or frame was selected during a Program and/or across Programs, a ratio of actual transactions over number of times an Object information was sent during a specific Program and/or across Programs, etc. In addition to some of the viewer action data mentioned above, other factors may include recent performance statistics, long term performance statistics, trend lines, market data, statistics related to follow-up targeting etc. It should be noted that some of these inputs could be feedback from the previous activity. Yet another input may include the viewer's activity in social media for one or more of Objects and/or frames of his interest during a Program, for one or more Objects and/or frames of his interest during a Program over a specified time period, one or more of Objects and/or frames of his interest across Programs over a specified time period etc.

An additional set of inputs may include data from other sales channels including off-line transactions. For example, the revenue target may be common across all potential sales channels. In that event the current status of aggregated revenue from all sources may also be used by the ACE for the computation.

One or more of the inputs outlined above could also be used while computing a bid for participation in real-time bidding for a viewer.

The customized offer, if made for an Object, could consist of things such as price, shipping duration (for example 2 days, 3 days etc.), shipping cost if any, any promotions such as additional coupons or more loyalty points etc. An alternative is that customized offer is made for one out of every "n" viewers independent of his/her profile and/or dependent on his/her profile allowing the Object advertiser to refine its targeting. Such customization could also be randomly used by the Object advertiser as it may want to gain additional insights into viewers and their respective behavior under certain circumstances. Similarly using the example of the golf course, the customized offer, if made to the viewer, could consists of things such as cost of playing on the course, hotel room cost, air fare to the location, maybe a free dinner and so on.

To get better insights into the computation-intensive nature of the ACE, consider an example of an Object advertiser who is advertising 10 dresses, 10 pairs of corresponding shoes and 10 matching handbags across 3 highly popular 30 minute long primetime Programs that air at the same time, and match the Object advertiser's desired demographics. If the total viewership across such Programs was 30 million viewers and 10% of the viewers were interested in, on average, three of the advertised Objects (one dress, the corresponding shoes and matching hand bag), the ACE will have to compute 9 million such customized offers in a span of 30 minutes. This requires ACE to compute 5,000 customized offers per second. Furthermore, if these customized offers are being computed to optimize the Object advertiser's one or more targets, then the computational requirement will increase substantially. The computational requirement grows further if each ad is uniquely structured subject to viewer profile. The computational requirements on the ACE are additionally much greater when highly time sensitive real-time bidding participation is also included in the mix. In a preferred embodiment, ACE should be implemented using customized hardware. If the software implementation is used then the performance will degrade subject to the required level of computations needed.

In another embodiment, an Object advertiser for example may broadly define 1,000 profiles and classify each incoming viewer profile in to one such group. This could simplify the ad structuring related computational tasks for the ACE.

One or more outputs of the ACE can be fed back to the inputs of the ACE. It should be noted that a simpler version of the above described real time adaptive feedback driven engine, the ACE, could also be implemented for the purpose of supporting the Object and/or Frame information provider.

As stated earlier, while the ACE is associated and typically reside with an Object Advertiser and/or Frame Advertiser but this is not necessarily true in all cases. The ACE may reside with the Content Provider in case it is acting as an Object Advertiser. For example, ABC Network may advertise one of its own Programs during another of their Programs. In another embodiment, a Content Provider may source the data from one or more Object and/or frame advertisers, collate the data in the desired format, and acts as the ad server. In further embodiment the ACE functionality could be split across two physical and/or virtual engines, one residing with a Content Provider and another with the Object and/or frame advertiser, working together. In yet another implementation, a physical machine may contain multiple virtual ACE's. In an alternative implementation, the ACE may reside at a third party such as a Demand Side Provider on behalf of a corresponding Merchant. In another embodiment, Object and/or frame information provider functionality may reside with the Content Provider.

Viewer Configuration:

In one of the embodiments, a viewer can configure the system according to his/her needs. For example, the viewer may not want to have any alcohol related Object ads, effectively making them non-selectable. A viewer interested in buying a car may configure a filter such that it only sees car and related Object's details as it hovers over a frame. Another viewer may only want to see handbag and shoe Objects and so on. The viewer can also configure how he or she wants to see the selected items, such as by hovering over it, view the specifics right away, and view them later or any combination thereof. In another enhancement, a viewer has the ability to filter the Objects by category. For example, a viewer may only be interested in automatically learning more about the all the dresses in the Program such as Academy Awards, without having to select one or more dresses.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A system comprising:
a viewing device;
a viewer interface device that is operably connected through at least one network to at least one content provider, at least one object advertiser, at least one frame advertiser, or combinations thereof,
wherein the viewing device is adapted to display a video and wherein the viewer interface device is adapted to accept viewer input to allow the viewer to select an instance comprising an object, a video frame, or a portion of a video frame from the video;
wherein, in response to selection of the instance, the viewer's profile is provided to advertisers in real-time so as to cause bidding in a real time auction among a plurality of advertisers for the selected instance; and
a plurality of real time adaptive feedback driven advertisement computation engines, each associated with an advertiser of the plurality of advertisers,
wherein, each of the plurality of real time adaptive feedback driven advertisement computation engines accepts as an input (a) from an associated advertiser of the plurality of advertisers: (1) at least one of the advertiser's business targets and (2) current status of the at least one of the advertiser's business targets, and (b) based on the viewer's selection: (3) the viewer's profile and (4) identity of the object, and produces a real-time bid optimized for the input in the real time auction, wherein the advertiser's business targets includes any of: (i) revenue, profit, inventory, market share, or growth rate of a product or product category associated with the instance or (ii) a number of viewers in or outside a defined demographic selecting instances associated with the product or the product category, and
wherein one of the plurality of real time adaptive feedback driven advertisement computation engines dynamically selects at least one advertisement for presentation to the viewer for the advertiser from among the plurality of advertisers with a winning bid, and the viewing device displays the at least one advertisement to the viewer.

2. The system of claim 1 wherein the viewing device is operably connected through at least one network to at least one content provider, at least one object advertiser, at least one frame advertiser, or combinations thereof.

3. The system of claim 2 wherein the viewing device can receive streaming video over the network.

4. The system of claim 1 wherein the server comprises a microprocessor configured for processing computer-executable instructions and at least one data storage devices connected, directly or indirectly, to the microprocessor.

5. The system of claim 1 wherein the network comprises at least one of a local area network (LAN), a wide area network (WAN), a cellular network, a satellite network, or the Internet.

6. The system of claim 1 wherein at least one viewer interface device is a personal computer, a mobile phone, a smartphone, a laptop computer, a notebook computer, a tablet computer, Google Glass, a smart remote control, an eye tracker or another hand-held device.

7. The system of claim 6 wherein the viewer interface device comprises a pointing device adapted to accept viewer input provided by a mouse, a track pad, a touch screen, or a verbal cue.

8. The system of claim 1 wherein the system is adapted to correlate the viewer input with a position on the video frame displayed on the viewing device.

9. The system of claim 1 wherein the at least one advertisement computation engine accepts at least one input selected from the group consisting of configuration data, program identifiers, frame identifiers, object identifiers, contents of a viewer profile, viewer action data, recent performance statistics, long term performance statistics, trend lines, other sales channel data, the viewing device type, the number of times the ad has been shown so far for at least one object or frame in a given time for a specific program or across programs, the number of customized offers made so far for at least one object or frame in a given time for a specific program or across programs, the number of times at least one object or the frames containing at least one object or frame have been saved in a given time for a specific program or across programs, the number of times at least one object or at least one frame containing at least one such object or frames has been instantaneously viewed in a given time for the specific program or across programs, the number of times information was requested or sent for at least one object or frame in a given time for a specific program or across programs, a ratio of actual transactions divided by the number of times an object or frame was selected during a program or across programs, a ratio of actual transactions divided by the number of times an object's information was sent during a specific program or across programs, statistics related to follow-up targeting, feedback from the previous activity, the viewer's activity in social media for at least one object or frame of their interest during a program, the viewer's activity in social media for at least one object or frame of their interest during a program, or across programs, over a specified time period, and combinations thereof.

10. The system of claim 1 wherein the at least one advertisement computation engine is adapted to generate an advertisement comprising:

a) information about the selected object, video frame, or portion of a video frame, or a product or service related to the selected object, video frame, or portion of a video frame, b) at least one offer from at least one merchant to the viewer that would enable the viewer to purchase the object, product, or service, or c) information about the selected object, video frame, or portion of a video frame, or a product or service related to the selected object, video frame, or portion of a video frame, and at least one offer from at least one merchant to the viewer that would enable the viewer to purchase the object, product, or service.

11. The system of claim 10 wherein the advertisement includes at least one link that is adapted to provide the viewer an opportunity to purchase the object, product, or service.

12. The system of claim 10 wherein the offer is a customized offer produced by the at least one advertisement computation engine based on a viewer profile, market data, an advertiser's business targets, the current status of an advertiser's business targets, or a combination thereof.

13. The system of claim 1 wherein the at least one advertisement computation engine is adapted to generate an advertisement wherein the advertisement is formatted for the targeted display device.

14. The system of claim 1 wherein the advertiser's business targets relate to business performance, including one or more of product pricing, revenue, profit, market share targets, growth rate, and inventory.

15. The system of claim 14 wherein each of the plurality of real time adaptive feedback driven advertisement computation engines is configured to produce for the associated advertiser a respective real time bid for the selected instance optimized for at least one of the advertiser's business targets in the real time auction.

16. The system of claim 15 wherein a real time adaptive feedback driven advertisement computation engine is configured to optimize a respective real time bid as a function of two or more of the advertiser's business targets.

17. The system of claim 1 wherein a server is configured to perform the real time auction to consider multiple iterative bids from among the plurality of advertisers until the advertiser having the winning bid is selected.

18. The system of claim 1 wherein a real time adaptive feedback driven advertisement computation engine produces a real-time bid based on a profile of the viewer.

19. The system of claim 1 wherein the one of the plurality of real time adaptive feedback driven advertisement computation engines computes a customized structure for content of the advertisement based on the viewer's profile and the at least one of the advertiser's business targets.

20. An advertisement computation method comprising:
receiving from a viewer a viewer selection, made from a viewer interface device, of an instance comprising an object, a video frame, or a portion of a video frame from a video displayed on a viewing device, wherein, in response to selection of the instance, the viewer's profile is provided to advertisers in real-time so as to cause bidding in a real time auction among a plurality of advertisers for the selected instance;
receiving at each of a plurality of real time adaptive feedback driven advertisement computation engines as an input (a) from an associated advertiser of the plurality of advertisers: (1) at least one of the advertiser's business targets and (2) current status of the at least one of the advertiser's business targets, and (b) based on the viewer's selection: (3) the viewer's profile and (4) identity of the object, and producing a real-time bid optimized for the input in the real time auction, wherein the advertiser's business targets includes any of: (i) revenue, profit, inventory, market share, or growth rate of a product or product category associated with the instance or (ii) a number of viewers in or outside a defined demographic selecting instances associated with the product or the product category; and dynamically selecting by one of the plurality of real time adaptive feedback driven advertisement computation engines at least one advertisement that is presented to the viewer on the viewing device for the advertiser from among the plurality of advertisers with a winning bid.

21. The method of claim 20 further comprising providing the viewer with access to information related to the selected instance.

22. The method of claim 20 wherein the information associated with the selected instance is accessed by the viewer using a URL.

23. The method of claim 22 wherein the URL provides access to the site of a merchant, the site of a manufacturer, a site providing special offers, or a site providing a mapping application that provides travel directions from the user's location to the location of a merchant.

24. The method of claim 21 wherein the selected instance is associated with a product or a service.

25. The method of claim 24 wherein the at least one advertisements relates to the product or service.

26. The method of claim 25 wherein the advertisement is displayed after the viewer selects a URL.

27. The method of claim 25 wherein the advertisement includes a URL leading to further information about the product or service.

28. The method of claim 25 wherein the advertisement includes a URL leading to a site supporting secured transactions to permit the viewer to purchase the product or service.

29. The method of claim 20 wherein the advertiser's business targets relate to business performance, including one or more of product pricing, revenue, profit, market share targets, and inventory.

30. The method of claim 29 wherein each of the plurality of advertisers produces a respective real time bid for the selected instance optimized for at least one of the advertiser's business targets in the real time auction.

31. The method of claim 30 wherein the respective real time bid is optimized as a function of two or more of the advertiser's business targets.

32. The method of claim 20 wherein the real time auction considers multiple iterative bids from among the plurality of advertisers until the advertiser having the winning bid is selected.

33. The method of claim 20 wherein the real-time bid is produced based on a profile of the viewer. least one of the advertiser's business targets.

34. The method of claim 20 further comprising computing a customized structure for content of the advertisement based on the viewer's profile and the at least one of the advertiser's business targets.

* * * * *

UNITED STATES PATENT AND TRADEMARK OFFICE
CERTIFICATE OF CORRECTION

PATENT NO. : 10,764,645 B2  
APPLICATION NO. : 14/602983  
DATED : September 1, 2020  
INVENTOR(S) : Chatter et al.

Page 1 of 1

It is certified that error appears in the above-identified patent and that said Letters Patent is hereby corrected as shown below:

In the Claims

In Column 22, Lines 24 and 25 Claim 33:  
Replace "produced based on a profile of the viewer. least one of the advertiser's business targets."  
With "produced based on a profile of the viewer."

Signed and Sealed this  
Tenth Day of November, 2020

Andrei Iancu  
*Director of the United States Patent and Trademark Office*